Jan. 26, 1932.  J. MERCIER  1,842,418
SUSPENSION DEVICE
Filed July 7, 1925   2 Sheets-Sheet 1

Jan. 26, 1932.  J. MERCIER  1,842,418
SUSPENSION DEVICE
Filed July 7, 1925  2 Sheets-Sheet 2

Patented Jan. 26, 1932

1,842,418

UNITED STATES PATENT OFFICE

JEAN MERCIER, OF PARIS, FRANCE

SUSPENSION DEVICE

Application filed July 7, 1925, Serial No. 42,024, and in France December 22, 1924.

My invention has for its object to place in opposition to the two principal movements of the axles of a suspended vehicle, i. e., the angular oscillations about its centre and the vertical movements, two distinct elastic devices which are characterized by the face that the functioning of the first will not diminish the responsiveness of the second, even when the two movements are superposed.

I will classify as follows the devices affording the desired results:

(A) There is superposed upon the known suspension devices a suspension device which may be designated as a device of the second class, which comes into action only according as the resultant of the vertical reactions of the known suspension devices will act upon the vehicle as a whole, while the rolling motion remains limited by the flexibility of the known suspension devices.

(B) A part of the known suspension device is placed out of action in the case in which the rolling motion takes place, while allowing the eliminated part to act if a vertical rectilinear motion becomes superposed upon the rolling motion but without increasing its amplitude.

(C) There is added to a suspension device—either of the known type or solely employed for straight motion—an anti-rolling device acting by its elastic deformation to oppose the rolling effect, while allowing the suspension device to still maintain its responsiveness as regards straight motion, even during the angular movements of the axle.

The appended Figures 1 to 4, which are in all cases of an entirely diagrammatic nature, show by way of example, various embodiments of the invention, but these are not of a limitative character.

I will first describe the arrangements relative to the case A, for the superposition of the suspension devices, examples of the same being given in Figures 1 to 4.

Figure 1:
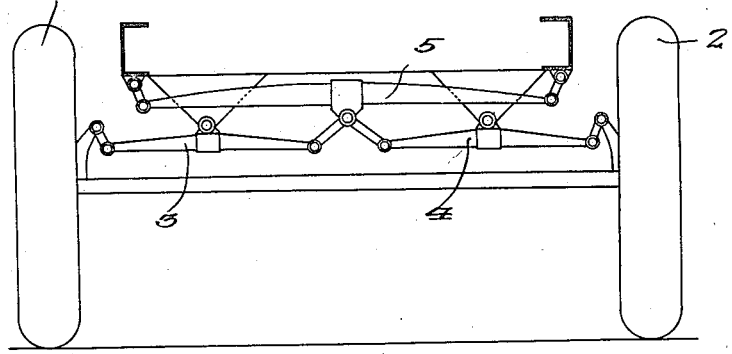

In Figure 1, the superposition is effected by a combination comprising two symmetrically disposed transverse springs 3 and 4, and a single transverse spring 5 of a semi-elliptic shape.

Figure 2:
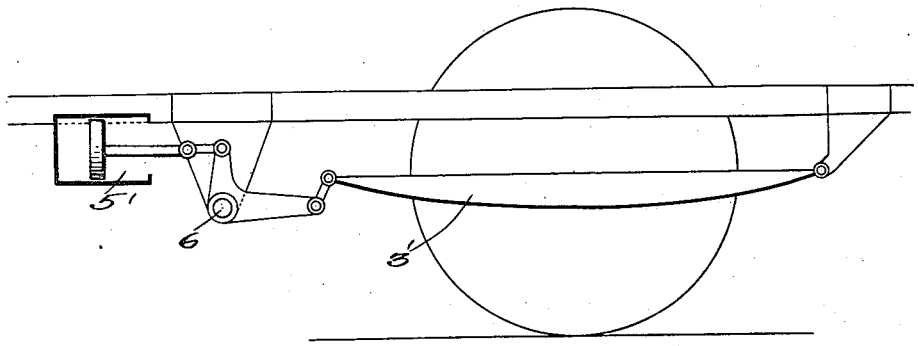

In Figure 2, the arrangement comprises a longitudinal spring 3' which is secured to one arm of a bell crank lever mounted on the shaft 6, the suspension device being completed by a dash pot member 5' which is operatively connected to the other arm of the bell crank lever.

Figure 3:
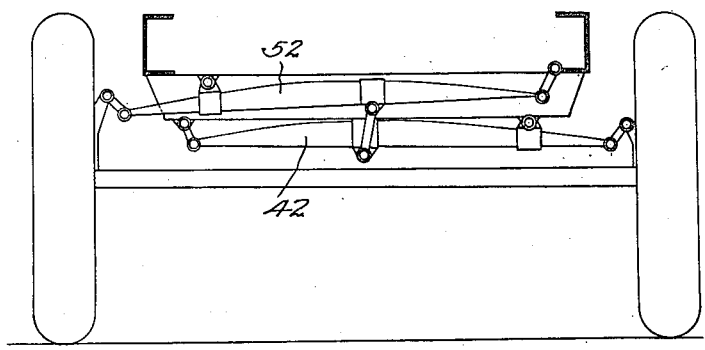

In Figure 3, the suspension device comprises a transverse spring $5^2$ which is suspended from the vehicle frame by shackles, and an additional spring $4^2$ which is disposed below the latter in the same vertical plane, the spring $4^2$ bearing upon the frame at its center.

Figure 4:
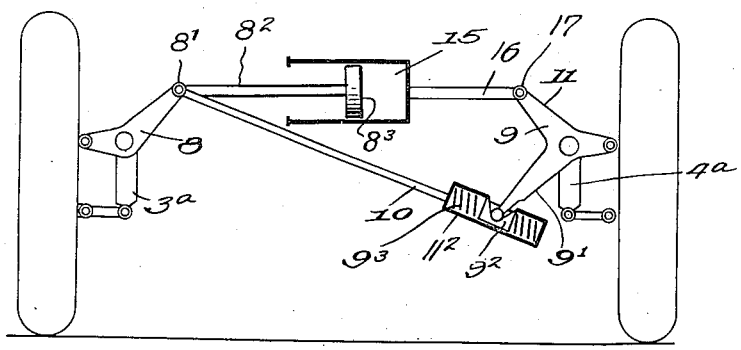

In Figure 4 is illustrated a varied form of suspension device, comprising two upright arms $3^a$ and $4^a$, each supported by the axle, each arm having a bell crank lever pivoted to its top, one arm of each lever bearing against the proximate wheel. It will be noted that the bell crank 8 is pivoted at 8' to the outer end of a piston rod $8^2$, the piston head $8^3$ being reciprocable in the dash pot cylinder 15. The cylinder 15 is carried on the end of a rod 16, which is pivoted at 17, to the upper arm 11 of the bell crank 9, carried by the vertical arm $4^a$.

Pivotally connected to the juncture point of the rod $8^2$ with the upper end of the arm of the bell crank 8, is a downwardly extending bar 10 carrying a small cylinder $11^2$ at its lower end. Said cylinder is operatively positioned below the bell crank 9, located opposite the bell crank 8, and is provided with a longitudinal slot in its upper face adapted to receive the lower end of the downwardly inclined arm 9' of said bell crank 9. A slide $9^2$ is mounted for reciprocation in said cylinder, the lower end of the arm 9' being pivotally secured to said slide, and a spring member $9^3$ is so positioned in the cylinder $11^2$ as to oppose longitudinal movement of the slide $9^2$ in either direction, under the movements of the arms of the bell crank.

The operation of the various devices is as follows:

During the vertical displacements of the vehicle axles, the two suspension devices act in series. The spring levers 3 and 4, which constitute suspension elements of the first class are actuated in like directions to an equal degree; they absorb their part of the motion and then impart their reaction either directly to the suspension device of the second class, i. e., the devices 5, either through the medium of the shaft 6 or through any other suitable jointed device, optionally rotatable, which will put in action the suspension device 5.

But in the case in which the vehicle has a rolling action, i. e., when one wheel 1 approaches the vehicle frame and the other wheel 2 is separated therefrom, only the suspension devices of the first class will enter into action, except where there is a vertical resultant of these two movements, and in this event (and solely to absorb the effect of said resultant) the suspension device of the second class will come into action, without causing any increase in the rolling motion, which as may be observed will still depend exclusively upon the degree of flexibility of the suspension devices of the first class.

In the aforesaid suspension devices, the reaction of one suspension device upon the other will obviously increase or diminish the amplitude of the oscillations according as the matter relates to a bilateral motion or a rolling motion; these two effects may also be superposed.

When traveling, the vehicle is obliged to overcome the very small reactions of the suspension devices, as well as the proper reaction of the anti-rolling device which may be as great as desired and which will alone intervene, in practice, if the suspension devices 5 are very elastic; so that even during the rolling motion, the suspension devices will be near their maximum flexibility, and as they are by no means impeded in their bilateral movements, they will be in the best conditions for absorbing rectilinear effort of the axle which may be superposed upon the rolling motion.

I claim:—

Suspension means for vehicles, including in combination with the vehicle wheels, a vertically extending arm operatively secured adjacent the inner side of each wheel, two bell crank levers, each of which is pivotally connected near its center to the upper end of one of said arms, a transversely-extending rod pivotally secured to the upper end of one of said bell cranks and carrying a dashpot cylinder at its inner end, a second rod pivoted to the upper end of the other bell crank and carrying at its free end a piston adapted for reciprocation in said cylinder, a downwardly-extending bar pivotally secured at one end to the point of connection of the shaft of said piston and said crank arm, and provided on its lower end with a small cylinder equipped with a slide adapted for longitudinal reciprocation therein, the lower arm of said bell crank being pivotally secured to said slide, and means in said small cylinder adapted for resisting movement of said slide in either direction.

In testimony whereof I have affixed my signature.

JEAN MERCIER.